July 6, 1965 H. KNABEL 3,192,569
APPARATUS FOR MOLDING ARTICLES OF PLASTIC
Filed July 10, 1962 2 Sheets-Sheet 1
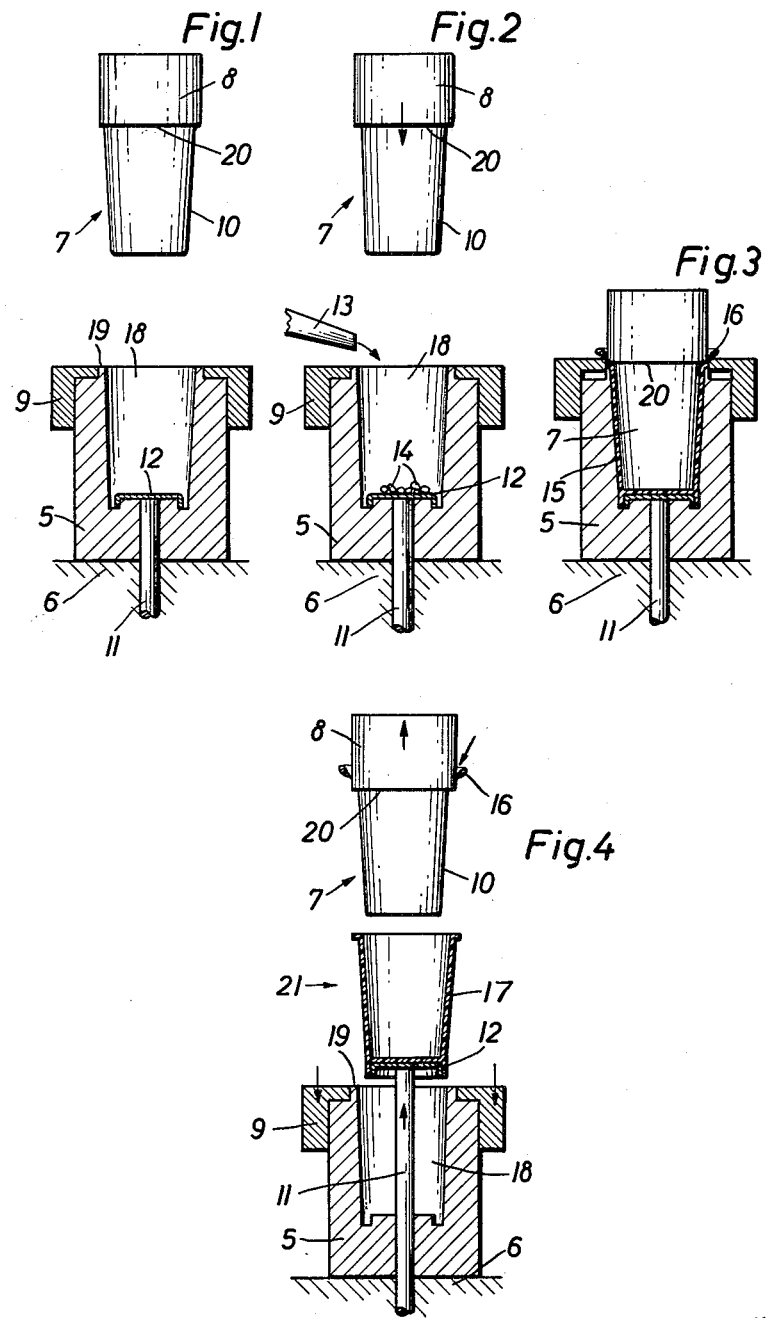
INVENTOR:
HORST KNÄBEL
BY Frederick Breitenfeld
ATTORNEY July 6, 1965  H. KNABEL  3,192,569
APPARATUS FOR MOLDING ARTICLES OF PLASTIC
Filed July 10, 1962  2 Sheets-Sheet 2

INVENTOR:
Horst Knäbel
BY
Frederick Breitenfeld
ATTORNEY 3,192,569
APPARATUS FOR MOLDING ARTICLES
OF PLASTIC
Horst Knabel, Hitzbroicher Weg 48, Sieglar,
Rhineland, Germany
Filed July 10, 1962, Ser. No. 208,798
Claims priority, application Germany, July 15, 1961,
K 44,253; May 23, 1962, K 46,820
4 Claims. (Cl. 18—42)

This invention relates to an apparatus for producing hollow and flat articles of thermoplastic or thermosetting materials. The term "hollow" as used herein refers to thin-walled articles such as glasses, bottles and bowls, and the term "flat" refers to thin plate-like articles.

In conventional procedures for producing such articles, the raw material is introduced into the mold by pouring, spraying, extruding, or dipping. All these procedures for direct utilization of the raw material have the disadvantage that the raw material must be prepared in advance, depending upon the nature of the operation, to make it useable. Moreover, depending upon the pecularities of the article to be made, and the characteristics of the raw material, it is sometimes impossible to use one or another of the abovementioned methods for introducing the raw material into the mold, and it must be decided which method can be used for the purpose.

In some conventional procedures the raw material is partially treated, prior to the production of the particular article desired, to produce foils, sheets, or tubes, which are thereafter formed, while they are in plastic condition, into the desired article by means of pneumatic pressure, vacuum, or direct pressure. These last mentioned procedures have another disadvantage, from the standpoint of output of articles in a given time and minimum use of material per product, since in addition to providing a molding device to produce the article it is necessary to provide a machine such as an extruder, a calendar, or a kneader, to provide the preliminary partial treatment. Moreover in these processes it is necessary to provide heat for both the molding operation and the preliminary treatment.

In the production of articles in accordance with customary procedures there is usually a considerable loss of thermoplastic material due to the fact that only a fraction of the material supplied is molded into the final product. Furthermore, when the excess material is sought to be reused, additional operations are required to reconvert the excess material into its original partially prepared condition.

Moreover in the production of hollow bodies in accordance with known procedures, the relationship between the height of the article and the width of the opening is somewhat restricted. Finally it should be noted that not all known thermoplastic materials are useful in connection with known procedures.

A general object of the present invention is to provide an apparatus for production of hollow or flat articles of the character referred to, in which the foregoing disadvantages have been avoided, and by means of which a high output rate of articles having accurate dimensional qualities can be achieved from a minimum input of energy and material. Articles of many different kinds can be produced in this economical fashion.

The objective of the invention is achieved by employing the raw material in the form of powder or in granular form, both of which are readily available commercially, and introducing it in measured charges to a mold consisting of male and female parts. The raw material is then subjected to a large impact, the kinetic energy of which is almost instantaneously transformed into heat energy in the raw material, this heat being sufficient to melt the raw material and to cause it to distribute itself in the mold cavity between the male and female parts of the apparatus. The distributed melted material then becomes cool and hardens in the shape of the mold cavity.

It will be seen, therefore, that in accordance with this invention the raw thermoplastic material requires no preliminary preparation. Having been introduced into the mold cavity in practical amounts, it is rendered fluid and distributed throughout the mold cavity by direct transformation of mechanical energy into heat energy. The molten material which thus fills the mold cavity cools immediately and rigidifies. Whatever excess raw material may have been introduced, and which exudes from the mold cavity after the impact, can be cut off very simply and the finished article can then be removed from the mold.

It will readily be seen that in this way it is not only unnecessary to perform any preliminary operation upon the raw material, but additionally it is possible to achieve a high rate of production. In addition it is possible to produce articles having projections such as ribs and other types of raised portions many of which might have been impossible to make by means of some of the customary procedures. Also, the ratio between the height and the width of the opening of hollow bodies can be substantially higher with the present process than with previous procedures. By introducing accurately measured charges of the raw material into the molding apparatus the loss due to the presence of excess material can be reduced to an unusually low point. In this connection it may be noted that the excess material, where it is of thermoplastic character, can be reused without any further preparation. What is more, it may be noted that in accordance with this invention materials can be used, such as polyethylene, which have heretofore not been practically useful in this manner.

It is another object of this invention to provide an apparatus of special character for transmitting kinetic energy to the raw material in a practical manner and at the same time distributing the liquified or melted plastic material throughout the mold cavity.

For achieving the last mentioned objective, one embodiment of the invention includes a means for introducing the raw material in a special auxiliary chamber directly adjacent to the mold cavity and in communication with it, and the desired kinetic energy is transmitted to the raw material by means of one or two pistons or plungers extending into this auxiliary chamber and capable of fully occupying the space within which the charge is preliminarily held. In this case the kinetic energy is transmitted to the raw material via a relatively small surface, as a result of which the surface-to-volume relationship of the raw material itself, prior to its liquifaction, can be retained at a very low value.

Another feature of the invention resides in the provision of means for evacuating all air from the mold cavity, and in certain cases from the auxiliary cavity, before the transmission of the kinetic energy to the charge. Elimination of air from the cavity aids the distribution of the liquified raw material, and additionally the possibility of air being trapped in the walls of the resulting article is practically avoided.

The apparatus for carrying out the present method consists, more specifically, of male and female mold parts and an impact mechanism such as a drop forge hammer for providing the kinetic energy, this hammer operating on the projecting end face of the male element to drive the latter into the female element to the desired degree.

Additional details of the invention are set forth in the following description in which two illustrative embodiments of the invention are described, reference being had to the accompanying drawings, in which:

FIGURE 1 is an elevational view, partly in section, of one embodiment of the invention, the parts being shown in the relationship they assume at the beginning of the process;

FIGURE 2 is a view similar to FIGURE 1 after the charge of raw material has been introduced into the female part of the mold;

FIGURE 3 is a view similar to FIGURE 1 after the male part of the mold has descended and the raw material has melted and been distributed in the mold cavity;

FIGURE 4 is a view similar to FIGURE 1, showing the manner in which the molded article, after cooling, can be lifted out of the female part of the mold and delivered to a point of collection;

Figure 5:
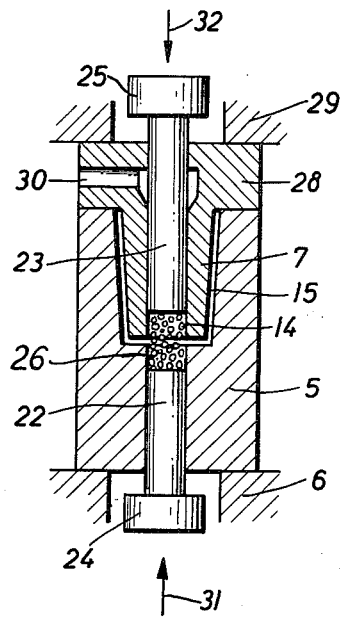
FIGURE 5 is a vertical cross-sectional representation of another embodiment of the invention, prior to the transmission of kinetic energy to the mold charge.

Referring to FIGURE 1, the female part 5 of the mold stands on a fixed base 6. The plastic article chosen for illustration is a frusto-conical thin-walled cuplike article, and therefore the mold cavity 18 in the part 5 has the general contour shown, corresponding to the outer contours of the device that is to be formed. On the bottom of the cavity 18, a plate 12 conforming to the shape of the floor of the article to be molded is mounted on a shaft or rod 11 extending downwardly through the mold part 5 and through the supporting base 6. By any suitable means, not shown, this rod is movable in a vertical direction.

The corresponding male part 7 of the mold shown in FIGURE 1 has a frusto-conical body 10 corresponding in contours to the contours of the inner surfaces of the cup or article to be molded. Above the body 10 is a cylindrical portion 8 whose diameter is slightly greater than that of the adjacent part 10, thus forming a shearing edge 20. On the upper part of the mold part 5 a shearing element 9 is mounted for cooperation with the edge 20, in the manner best shown in FIGURE 3, when the male part of the mold is fully inserted into the female part. Means (not shown) are provided for moving the shearing element 9 in a vertical direction.

In carrying out the present procedure, a material feeding device, not shown, introduces a measured charge of raw material through chutes or other guides 13 (FIGURE 2) into the mold cavity 18. The material is in the form of granules or powder of the commercially available type, and the charge 14 is measured as accurately as possible with respect to the article to be formed to avoid the presence of excess material in the mold. Thereupon the frusto-conical portion 10 of the male part of the mold is lowered into the female part, the cylindrical portion 8 remaining in an outwardly projecting disposition. By mechanism not shown, involving a heavy impact tool or hammer, such as a drop forge, a massive blow is imparted to the outer surface of the portion 8. The kinetic energy of this impact is transmitted through the male part 7 to the raw material 14 wherein it is converted into heat energy as a result of which the raw material becomes completely molten. This procedure occurs almost instantaneously so that the molten thermoplastic or thermosetting material, while still under the influence of the applied impact, is distributed throughout the mold cavity formed between the female part 5 and the male part 7. The amount of the granular or powdered charge will have been so chosen that the molten material fills the mold cavity as accurately as possible, with a minimum of excess, if any, squeezing out of the upper part of the cavity as indicated at 16 in FIGURE 3. The molten material in the mold cavity 15 cools almost instantaneously by its contact with the walls of the female mold part 5 and the male mold part 7, and thus becomes solidified and rigid.

FIGURE 3 indicates how the excess material 16 is cut off by upward movement of the shearing element 9 into cooperative relationship with the shearing edge 20.

As shown in FIGURE 4, after the excess material 16, if any, has been severed from the molded articles, the male part 7 of the mold is lifted upwardly and the finished article 17 is then pressed out of the female part of the mold by upward movement of the rod 11, the upward movement of the plate 12 serving to push the article 17 completely out of the mold. By means of an air blast indicated by the arrow 21, or equivalent means, the finished article can be blown laterally off the plate 12 and delivered to a point of collection. The rod 11 then returns to its original lowered position, and any excess plastic material adhering to the portion 8 (FIGURE 4) of the male part 7 is scraped off by an appropriate tool (not shown) and the parts are thus restored to the original condition as indicated in FIGURE 1, in readiness for the next sequence of operations.

It will be understood that in the production of tubes or other articles upon which additional operations are performed after the molding step, it is not necessary to shear the upper edge of the molded article, as described above, since this operation can be carried out in conjunction with the other treatments to which the article is subjected.

The force of the impact or hammer-blow applied to the part 7 is naturally dependent upon the nature of the thermoplastic material employed in any given case, and the nature of the article being formed. Should a source of impact energy be available which is greater than that required, it is obviously advantageous to use only as much energy as it is required for successfully carrying out the procedure as hereinbefore described. Also, in certain cases it may be advantageous to form the mold in such a way that the mold cavity 15 is sealed on all sides, whereby it may be evacuated by any suitable suction mechanism, not shown, prior to the application of the kinetic energy to the mold charge.

Figure 6:
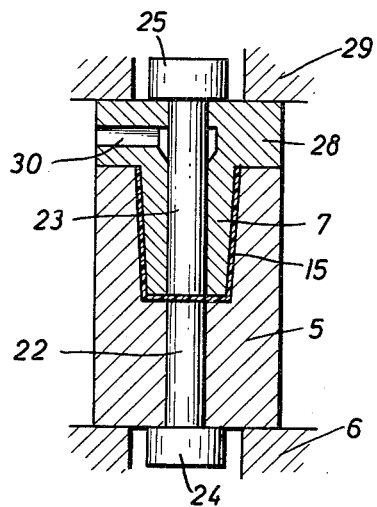
FIGURE 6 is a view similar to FIGURE 5 after the raw material has been distributed throughout the mold cavity.

In the embodiment of the invention illustrated in FIGURES 5 and 6 those parts which are the same as those hereinbefore described bear the same reference numerals. In this case, as before, a female mold part 5 rests upon a fixed base 6, and a male part 7 lies within the cavity of the part 5, the broadened portion 28 of the male part 7 resting firmly against the upper surface of the female mold part 5. A clamping element 29 serves to press the mold part 7 firmly against the female part 5. The space between the mold parts is contoured to form a mold cavity which corresponds to the contours of the article to be produced.

The mold parts 5 and 7 are provided with aligned longitudinal bores, and plungers 22 and 23 are mounted in these bores, respectively, in opposed relationship. Each of the plungers 22 and 23 is provided with an enlarged head, as indicated at 24 and 25, and the parts are so proportioned that when the enlarged heads 24 and 25 lie in contact with the outer surfaces of the mold parts 5 and 7, respectively, as indicated in FIGURE 6, the plungers 22 and 23 completely occupy the bores in which they are mounted, and their inner surfaces lie flush with the adjacent surfaces of the mold cavity 15.

In the illustrated embodiment, the plungers 22 and 23 are mounted for vertical movements. The enlarged portion 28 of the male mold part 7 is provided with a lateral feeding aperture or opening 30 which communicates with the bore in which the plunger 23 is mounted, the junction between the opening and the bore being of substantially conical shape, as shown.

When a charge of granular or particulate material is to be introduced into the mold, the plunger 23 is moved upwardly far enough to open the communication between the passage 30 and the bore in which the plunger moves. The raw material is then introduced through the channel 30, in preparation for which the plunger 22 will have been withdrawn downwardly, as indicated in FIGURE 5. The plunger 23 is then restored to its lower position, as indicated in FIGURE 5. With the plungers in this condition, the space between the plungers 22 and 23 can be considered to be an auxiliary recess or cavity 26 which is directly adjacent to and in communication with the mold cavity 15. By any suitable means, not illustrated, the auxiliary recess 26 and the mold cavity 15 may be evacuated. The apparatus is then ready for the application of kinetic energy.

As before, an impact mechanism adapted for the purpose, which in this case may consist of opposed hammering elements or tools, is brought into action, the impact being applied to the heads 24 and 25 of the plungers 22 and 23 in the direction of the arrows 31 and 32. As a result the plungers 22 and 23 are driven into the auxiliary chamber 26 and in the manner hereinbefore described the kinetic energy of the impact is converted into heat energy in the plastic material whereby the latter immediately becomes liquified and spreads throughout the mold cavity 15 as indicated in FIGURE 6. It will be noted that the enlarged heads 24 and 25 lie directly against and in contact with the outer surfaces of the mold parts 5 and 7, and that the inner surfaces of the plungers 22 and 23 are flush with the adjacent parts of the mold cavity. Thereafter, by removing the clamping element 29 and withdrawing the male part 7 of the mold from the female part, the solidified and cooled article may be withdrawn from the mold in any desired manner. After removal of the article, the male and female parts are set together again in the manner shown in readiness for the next succeeding molding operation.

It may be desirable, at the commencement of molding operations, to raise the temperature of the mold parts to the region of 40°–60° centigrade. At room temperature, it is possible that the molten material within the mold cavity will tend to cool and rigidify faster than desired, as a result of which the molten material may not have an opportunity to be completely distributed throughout the mold cavity. However, heating of the mold parts is necessary only at the commencement of operations, since subsequent operation of the apparatus causes it to absorb heat from the plastic material itself. In fact, the absorbed heat may under certain circumstances be so great that it becomes necessary or desirable to cool the molding apparatus. An adequate heating and cooling apparatus may be advantageously afforded by a system of conduits or cooling pipes, suitably positioned in association with the mold parts, for reception of a suitable heating medium at the commencement of operations and the accommodation of a suitable cooling medium at subsequent times.

It goes without saying that the embodiments illustrated and described herein are offered merely by way of example, and that many modifications of the apparatus shown are possible without departing from the scope of the invention as expressed in the appended claims. Thus, it is possible by means of this procedure to form platelike or relatively flat articles by interposing the raw material between a pair of relatively flat mold parts, the kinetic impact being applied to these elements and transmitted by them to the material lying in the space between them. Such mold parts would obviously be the equivalent of the male and female mold parts herein described and illustrated.

Similarly, it is within the purview of the invention to form the male and female mold parts in such a way that more than one article may be formed between them simultaneously under the impact of a single hammer blow. The male and female parts under those circumstances would be provided with a plurality of mold cavities and cooperating mold parts. These and other modifications of the invention will suggest themselves to those skilled in the art, the essential feature of the invention lying in the direct application of impact to the raw material and in the almost instantaneous transformation of kinetic energy into heat energy which melts the material and distributes it throughout the mold cavity.

What is claimed is:

1. A molding apparatus for producing thin-walled plastic articles, comprising complementary mold parts adapted to define a mold cavity between them, said mold parts being formed with a pair of aligned auxiliary chambers on opposite sides of said cavity and directly adjacent to it and in communication with it, said mold parts including plungers extending into and movable within said chambers respectively, said plungers being movable toward and away from each other and adapted to accommodate between them a measured charge of raw plastic material in particulate form, and each plunger being provided with an exteriorly exposed head adapted to withstand a massive sudden impact effective to move said plungers toward each other so suddenly and with such force that the charge of particulate material can be instantaneously reduced to a molten flowable condition.

2. A molding apparatus as defined in claim 1, in which said plungers are so dimensioned that when they are driven toward each other to maximum extent their inner ends lie flush with the mold cavity walls and form part of the latter.

3. A molding apparatus for producing thin-walled plastic articles, comprising complementary mold parts adapted to define a mold cavity between them, said parts being provided with aligned bores on opposite sides of the mold cavity and directly adjacent to and in communication with it, plungers movable in said bores and defining at their inner ends a pair of opposed walls adapted to accommodate between them a measured charge of raw plastic material in particulate form, each plunger being provided at its outer end with an exteriorly exposed head adapted to withstand a massive sudden impact effective to drive said plungers toward each other so suddenly and with such force that the charge of particulate material can be instantaneously reduced to a molten flowable condition.

4. A molding apparatus as defined in claim 3, in which one of said mold parts is provided with a feed passage communicating with one of said bores and through which said charge of particulate material may be introduced.

References Cited by the Examiner
UNITED STATES PATENTS

| | | | |
|---|---|---|---|
| 2,569,226 | 9/51 | Carter | 18—55 |
| 2,673,371 | 3/54 | Uhlig | 18—55 |
| 2,755,532 | 7/56 | Pallier. | |
| 2,948,923 | 8/60 | Rocca et al. | 18—16.5 |
| 2,981,976 | 5/61 | Maier | 18—42 |
| 2,987,775 | 6/61 | Albrecht et al. | 264—323 |
| 3,005,234 | 10/61 | Oriani et al. | 18—42 |
| 3,075,246 | 1/63 | Stiller | 18—42 |
| 3,092,440 | 6/63 | Rex et al. | 18—30 |

MICHAEL V. BRINDISI, *Primary Examiner.*

ALEXANDER H. BRODMERKEL, ROBERT F. WHITE, *Examiners.*